United States Patent

McLaughlin

[15] 3,645,214

[45] Feb. 29, 1972

[54] COMPARTMENT ARRANGEMENT FOR RAILWAY CARS

[72] Inventor: Gerald McLaughlin, Western Springs, Ill.

[73] Assignee: Unarco Industries, Inc., Chicago, Ill.

[22] Filed: July 5, 1966

[21] Appl. No.: 566,701

[52] U.S. Cl.............................105/369 B, 105/376, 105/378
[51] Int. Cl. .....................................B60p 7/14, B61d 45/00
[58] Field of Search..............................105/369 B, 378, 376

[56] References Cited

UNITED STATES PATENTS

| | | | |
|---|---|---|---|
| 2,930,332 | 3/1960 | Cook et al. ............................. | 105/378 |
| 3,163,130 | 12/1964 | Lundwall............................. | 105/369 B |
| 3,190,239 | 6/1965 | Davis et al. ............................ | 105/378 |
| 3,212,458 | 10/1965 | Robertson........................... | 105/369 B |
| 3,217,664 | 11/1965 | Aquino et al. .......................... | 105/376 |

*Primary Examiner*—Drayton E. Hoffman
*Attorney*—Bair, Freeman & Molinare

[57] ABSTRACT

A railroad car having side doorways which are offset from one another towards different ends of the car such that each doorway is positioned opposite a fixed, immovable sidewall of the car. The interior of the car is fitted with two transverse bulkheads or "load dividers" which may be moved longitudinally within the car. A set of "side filler" bulkheads is positioned along each car sidewall.

1 Claim, 3 Drawing Figures

PATENTED FEB 29 1972  3,645,214

INVENTOR
GERALD McLAUGHLIN
BY Bair, Freeman & Molinare
ATTORNEYS

COMPARTMENT ARRANGEMENT FOR RAILWAY CARS

BACKGROUND OF THE INVENTION

This invention relates to an arrangement for securely retaining cargo against movement within railway cars, trucks, trailers, and the like.

Modern cargo carriers commonly include movable bulkheads which may be positioned and latched to securely retain the load against shifting as the load bed is subjected to shock, vibration and the forces of acceleration and deceleration. To prevent lateral shifting, the load is commonly confined between one sidewall of the car and a movable bulkhead (commonly called a "side filler") which may be latched in position at various distances from the opposing sidewall of the car. In order to prevent longitudinal shifting, the load is commonly separated into two cargo carrying compartments separated by "load dividers" which may be moved longitudinally of the car and latched in position to securely retain the load.

In conventional side-loaded cargo carriers, such as railway cars, the floor area between the two side doorways is usually left unloaded to prevent damage by reason of load shifting in that area, and in those instances where loading is attempted, efforts to uniformly prevent damage have been unsuccessful. Further, because of the configuration of such side-loaded prior art cargo carriers, the central portion of the load bed is not well adapted for transporting palletized cargo since side fillers cannot be readily mounted over the doorway openings without blocking free access to the cargo through the doorways.

It is accordingly a principal object of the present invention to securely retain a substantially larger volume of cargo within the load bed of a railway car, or the like, by more efficiently utilizing the existing space within the car.

It is a further object of the present invention to increase the load-carrying capacity of a cargo carrier while permitting the carrier to be completely and securely loaded from either side of the car.

It is a further object of the invention to securely retain a cargo of various dimensions in a more efficient manner within the cargo carrier.

SUMMARY OF THE INVENTION

In a principal aspect, the present invention takes the form of a novel and improved interrelationship between the placement of the doorways, side fillers, and load dividers within a cargo carrier. The load bed of the carrier comprises a substantially rectangular floor surface surrounded by two opposing sidewalls and two opposing end walls. According to a first feature of the invention, the doorways defined in the opposing sidewalls are offset towards different ends respectively of the cargo carrier such that they overlap at most by only a minor portion of their longitudinal width. According to a second feature of the invention, side fillers are also placed on that portion of the sidewall which opposes each doorway such that additional cargo may be securely retained between each door and the opposing side fillers. The novel cargo carrier contemplated by the present invention is capable of securely retaining a cargo of increased volume without requiring an increase in the inside dimensions of the carrier; allows the carrier to be readily loaded or unloaded through the doorway defined in either side of the car; and, permits the load to be equally distributed within the load bed both laterally and longitudinally.

BRIEF DESCRIPTION OF THE DRAWINGS

These and other objects, features and advantages of the present invention may be more clearly understood through a consideration of the following detailed description. In the course of this description, reference will frequently be made to the attached drawing in which.

DESCRIPTION OF THE PREFERRED EMBODIMENT

In order to facilitate cargo handling, it has been common practice to place goods on platforms or "pallets" of predetermined size, typically 40 by 48 inches in horizontal cross section. Lift forks, and the like, which engage with the pallets may then be employed to load and unload the goods from cargo carriers and otherwise transport the goods from place to place. Because the pallets have standardized dimensions, it is possible to stack the goods in a predetermined arrangement within the cargo carrier.

Figure 1:
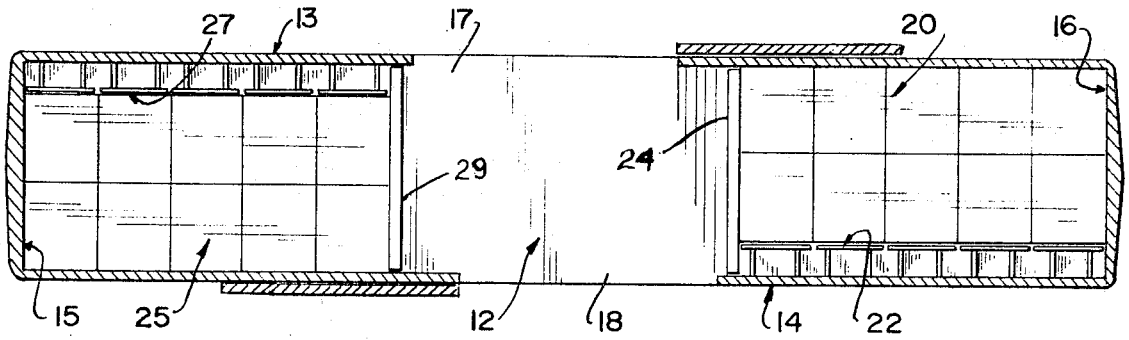
FIG. 1 is a top view of a prior art railway car showing the typical placement of load dividers and side fillers in relation to the side doorways.

FIG. 1 of the drawing shows a typical railcar provided with means for confining stacked pallets against shifting during transport. The conventional prior art rail car shown in FIG. 1 includes a substantially rectangular floor surface indicated at 12, a pair of sidewalls shown generally at 13 and 14, and a pair of end walls 15 and 16. A doorway indicated at 17 is defined in the sidewall 13, while an opposing doorway 18 is defined in the sidewall 14. The doorways 17 and 18 are commonly centered in the sidewalls, as shown in FIG. 1, may be slightly offset from one another. A first set of stacked pallets indicated generally at 20 is confined between the sidewall 13, the end wall 16, a series of "side fillers" shown generally at 22, and a longitudinally moving bulkhead or "load divider" indicated at 24. Similarly, a second set of stacked pallets indicated generally at 25 is confined between the end wall 15, sidewall 14, a series of side fillers 27 and a movable load divider 29. The side fillers 22 and 27 comprise movable panels which may be placed flush against the wall to which they are affixed or may be moved outwardly from the wall and latched in a desired position to hold the pallets in place. The movable load dividers 24 and 29 have their planes parallel with the plane of the end walls 15 and 16 and may be moved into engagement with the pallets to prevent longitudinal load shifting.

As may be clearly seen in FIG. 1, the conventional pallet-loading scheme used in railway freight cars does not permit the car to be fully loaded with securely held pallets. The unused open space between the load dividers 24 and 29 is rendered unsuitable for palletized shipping due to the inability to place side fillers over the doorways yet still permit convenient loading and unloading of the car.

The novel cargo-carrying scheme contemplated by the present invention, however, permits a much larger volume of freight to be loaded within a car having given inside dimensions. The railway freight car shown in FIG. 2 of the drawing includes end walls 30 and 31, and sidewall sections 34 through 37. The longer sidewall section 34 and the shorter sidewall section 35 define a doorway 39 in one side of the car which is offset towards the end section 30. The longer and shorter sidewalls 37 and 36, respectively, define a doorway 40 which is offset toward the end section 31. A plurality of side fillers indicated at 43 are affixed to the interior of sidewall section 37 while a second series of side fillers indicated at 45 are affixed to the interior of the longer sidewall section 34. Movable load dividers 47 and 48 are mounted for bodily longitudinal movement within the interior of the car, and a pair of doors 49 and 50 are employed to close the doorways 39 and 40, respectively.

The side fillers 43 and 45 may take a variety of forms. A preferred type of side filler for use in conjunction with the present invention is disclosed in U.S. Pat. application Ser. No. 483,566, filed Aug. 30, 1965, by Russell M. Loomis. These side fillers are adjustable to a plurality of lateral positions to accommodate a variety of sizes of cartons or pallets and, in addition, may be adjusted longitudinally of the car to accommodate loads of varying lengths.

Although a variety of movable load dividing bulkheads may be employed in conjunction with the present invention, load dividers 47 and 48 are preferably of the type disclosed in U.S. Pat. No. 3,168,055 which issued to E. Vander Hyde et al. on Feb. 2, 1965. The bulkheads described in the Vander Hyde et al. patent hang from an overhead track and include a latching and release mechanism control member which is accessible from either edge of the bulkhead and which may be operated from either side of the car without the necessity of entering the car.

Figure 2:
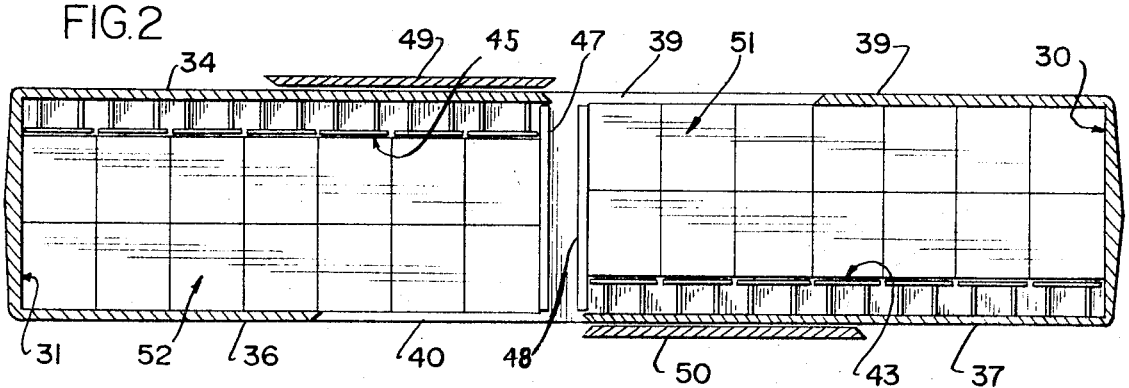
FIG. 2 is a top view wherein the doorways, side fillers and load dividers are arranged in accordance with the invention.

The railcar shown in the top view of FIG. 2 of the drawing is shown completely filled with two groups of stacked palletized containers indicated generally at 51 and 52. Typically, the load dividers 47 and 48 are initially moved to the left of doorway 40 to permit free access to the floor surface area in the "deep end" of the car bounded by end wall 30. The pallets 51 are placed into the car in sequence, adjusting the side fillers to the necessary width required to firmly confine the pallets in place. During this time, door 49 is already closed to form the lateral support for the six pallet stacks 51 nearest load divider 48. The load divider 48 is then moved into position against the stacked pallets 51 and locked in place. The second load divider 47 is then temporarily positioned closely adjacent load divider 48 to permit free access to the "short end" of the car terminated by end wall 31. Pallets 52 are then sequentially placed in position, adjusting the side fillers 45 to retain these pallets against lateral shifting. The three side fillers in the series 45 which are closest to the load divider 47 are preadjusted prior to loading the six pallet stacks 52 nearest load divider 47. Finally, load divider 47 is moved into tight engagement with the stacked pallets 52, locked in place, and the door 50 is closed to secure the pallets 52.

Figure 3:
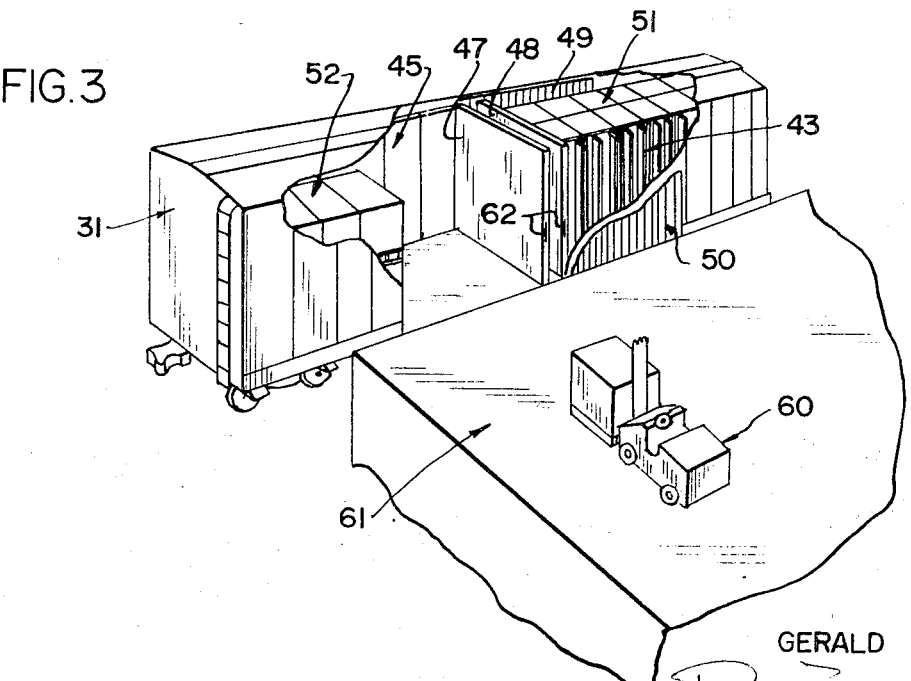
FIG. 3 is a perspective view showing a railway car partially loaded in accordance with the invention.

FIG. 3 of the drawing shows a typical loading operation of the freight car shown in FIG. 2 using a fork lift indicated generally at 60 which operates from a load platform 61. After the loading is complete, the door 50 is moved longitudinally over the doorway 40 and laterally inward to close the door and clamp the last six pallet stacks into position. A suitable door hinge arrangement capable of both lateral movement into and out of the doorway and longitudinal sliding movement to and from the open position motion is shown in U.S. Pat. No. 2,605,515, which issued to W. A. Beauchamp on Aug. 5, 1952. In the closed position, the inside surface of the door is preferably flush with the inside surface of the sidewall defining the doorway. As previously mentioned, the load dividing bulkheads 47 and 48 may be latched or released from either side of the car by manipulation of operating levers indicated at 62.

The pallet-confining arrangement used within the novel cargo carrier shown in FIGS. 2 and 3 substantially eliminates wasted space within the car. The unused space between load dividers 47 and 48 shown in FIG. 2 is narrower than the width of a single pallet. The doorways 39 and 40 are enlarged and have a width equal to a multiple of the pallet length plus the distance between the outside walls of the load dividing bulkheads. The length of each of the sidewall sections 34 through 37 are each approximately equal to a multiple of the pallet width. When the car is fully loaded, the load dividers 47 and 48 are spaced on opposite sides of the laterally extending center line 63 of the car. The substantial offset between doorways 39 and 40 permits the major portion of each closed doorway to be aligned opposite a rigid wall section to which side fillers may be affixed, thereby permitting the space adjacent the doorways to be used by clamping the palletized load between the door and the opposite side fillers.

It is to be understood that the embodiment of the invention which has been described is merely illustrative of one application of the principles of the invention. Numerous modifications may be made by those skilled in the art without departing from the true spirit and scope of the invention.

What is claimed is:

1. An improved car-loading construction for use in elongated, wall-enclosed railway cars of the type utilizing therein longitudinally movable load-confining transverse bulkheads which are adapted to be located generally centrally of the ends of the car to project across substantially the entire width of the car; said improved car-loading construction comprising, in combination, the longitudinal sidewalls of the car each having a single doorway therein located between the ends of the wall to divide the wall into spaced long and short sections, the doorways being offset toward different ends of the car so that the major portion of each doorway is directly opposite the long wall section of the opposing sidewall, side-filling panels mounted on the inside surface of each of said long wall sections and being adjustable toward and away from the corresponding long wall section, so that the transversely adjustable side-filling panels on one long wall section and a longitudinally adjustable transverse bulkhead may cooperate to substantially fully enclose the load in one end of the car substantially to the midpoint of the car without adversely affecting the ability to load the other end of the car, the car being adapted to carry pallet-mounted loads or the like and the length of both the long and short wall sections of the sidewalls of the car being selected to be substantially equal to whole multiples of a dimension of the pallet, said major portion of the doorway being substantially equal to a plural multiple of a dimension of the pallet, and that portion of each doorway which is not included in said major portion being narrower than a dimension of the pallet.

* * * * *